O. P. CHUBBUCK.
SET SCREW GUARD.
APPLICATION FILED DEC. 10, 1909.
1,038,085.
Patented Sept. 10, 1912.
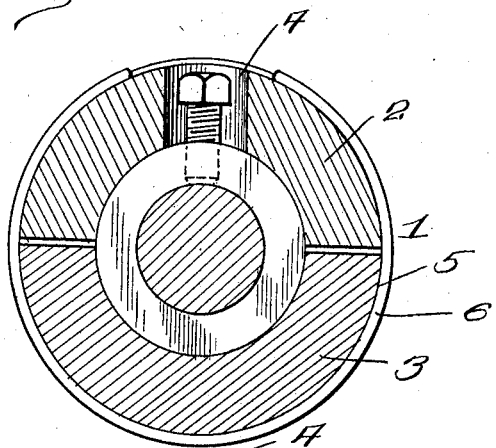
Fig. 1.
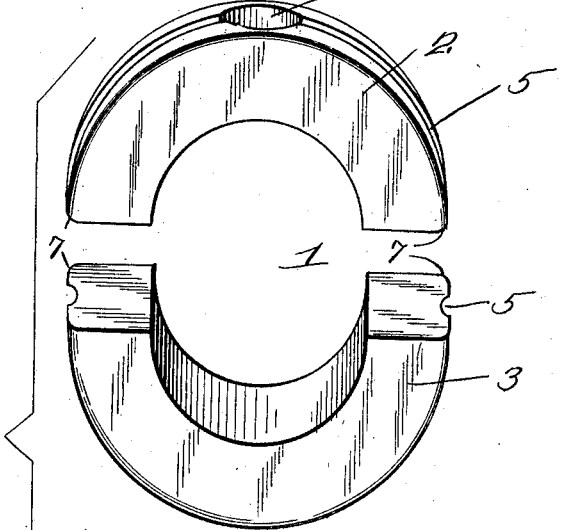
Fig. 2.
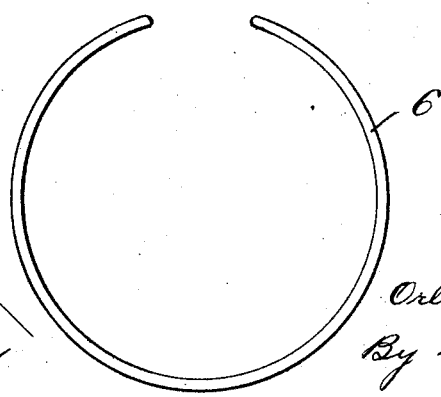

UNITED STATES PATENT OFFICE.

ORLO P. CHUBBUCK, OF PEORIA, ILLINOIS, ASSIGNOR TO AVERY COMPANY, OF PEORIA, ILLINOIS, A CORPORATION OF ILLINOIS.

SET-SCREW GUARD.

1,038,085.  Specification of Letters Patent.  Patented Sept. 10, 1912.

Application filed December 10, 1909. Serial No. 532,496.

*To all whom it may concern:*

Be it known that I, ORLO P. CHUBBUCK, a citizen of the United States, residing at Peoria, in the county of Peoria and State of Illinois, have invented certain new and useful Improvements in Set-Screw Guards, of which the following is a specification, reference being had therein to the accompanying drawing.

This invention relates to improvements in set screw guards.

The object of the invention is to provide a cheap and simple guard which may be readily applied to or removed from a rotating part having a set screw, which will completely cover the set screw to prevent accident or injury to persons or objects, and which will permit the adjustment of the set screw without the removal of the guard.

Of the drawings—Figure 1 is a cross-sectional view showing a guard embodying my invention applied to a collar which is secured to a shaft by means of a set screw. Fig. 2 is a perspective view showing the parts of the guard separated from one another.

Referring to the drawings, 1 represents the body of the guard as a whole. It is annular in shape, the central aperture being adapted to fit over and closely engage with the shaft collar, pulley hub, or other device, upon which the guard is to be used. In the drawings I have shown this central aperture as circular, but it will be understood that other shapes may be used to conform with the outline of the collar or pulley hub. The guard body or annulus 1 is composed of two separate halves 2 and 3, the line of division being along a diameter. In one of these halves or segments, as, for instance, 2, there is provided a radial aperture 4 extending entirely through the segment. This aperture is made of sufficient diameter to give ample clearance around the set screw in order to permit the use of a socket wrench, whereby the set screw can be adjusted without removing the guard.

5 is a circumferential groove formed in the outer surface of the guard. This groove is adapted to receive a spring clip 6 formed preferably of spring steel wire of circular cross section. This clip is constructed to surround the segments of the guard with the exception of the short distance across and immediately adjacent to the aperture 4. The spring action of the clip forces the segments together and into firm frictional engagement with the shaft collar or pulley hub. The clip also serves as a key to prevent longitudinal displacement of the segments relative to each other. The set screw serves as a key to prevent rotative or longitudinal movement of the guard as a whole relative to the collar or hub. The two segments are made slightly less circumferentially than would be necessary to completely encircle a shaft, thus when the two segments are placed on the shaft their adjacent ends will be spaced a slight distance away from each other and thereby allow the spring action of the clip to press the segments into firm engagement with the shaft. The corners at 7 are preferably beveled or rounded to permit the clip to be easily sprung into place and also to give a smooth outline for the device as a whole.

I prefer to form this set screw guard of wood, but any other suitable material may be used.

It will be noted that the device is one which may be cheaply manufactured and which may be quickly and easily applied without the use of special tools. When the guard is in place, a smooth outline is presented which prevents all possible danger of accident.

What I claim is:

In a set screw guard, the combination of a circumferentially grooved annulus comprising two readily detachable and separable segments adapted to closely engage upon a pulley hub with their adjacent ends slightly separated from each other, one of the said segments having a through radial aperture adapted to receive a set screw and allow the adjustment thereof; and a spring clip adapted to embrace the said annulus in engagement with the groove thereof to hold the said segments in position relative to each other, substantially as set forth.

In testimony whereof I affix my signature, in presence of two witnesses.

ORLO P. CHUBBUCK.

Witnesses:
A. L. GREGORY,
W. A. GASS.